United States Patent [19]

Yoshida

[11] 4,448,163
[45] May 15, 1984

[54] IGNITION TIMING CONTROL DEVICE FOR INTERNAL COMBUSTION ENGINES

[75] Inventor: Kenichi Yoshida, Yokosuka, Japan

[73] Assignee: Nissan Motor Company, Limited, Yokohama, Japan

[21] Appl. No.: 322,168

[22] Filed: Nov. 17, 1981

[30] Foreign Application Priority Data

Dec. 11, 1980 [JP] Japan ................. 55-174990

[51] Int. Cl.³ ............................. F02P 5/04
[52] U.S. Cl. ........................ 123/422; 123/425
[58] Field of Search ............ 123/415, 422, 425; 73/35

[56] References Cited

U.S. PATENT DOCUMENTS

| 4,133,475 | 1/1979 | Harned et al. | 123/425 |
| 4,269,154 | 5/1981 | Iwata et al. | 123/425 |
| 4,344,400 | 8/1982 | Asano | 123/435 X |
| 4,357,918 | 11/1982 | Asano | 123/425 |

FOREIGN PATENT DOCUMENTS

| 2546705 | 5/1976 | Fed. Rep. of Germany . |
| 2659239 | 7/1977 | Fed. Rep. of Germany . |
| 2832594 | 2/1979 | Fed. Rep. of Germany . |
| 2051233 | 1/1981 | United Kingdom . |

OTHER PUBLICATIONS

Die Anwendung des Mikroprozessors in de Giditalen Motorelektronik Im Kraftfahrzeug, *VDI-Berichte Nr. 370*, pp. 391-400, 251-258 (1980).

Primary Examiner—Tony M. Argenbright
Attorney, Agent, or Firm—Schwartz, Jeffery, Schwaab, Mack, Blumenthal & Koch

[57] ABSTRACT

An ignition timing control device for an internal combustion engine, which avoids excessive knocking during sudden acceleration. There is provided means responsive to the manipulation of the engine to generate a signal. The signal thus generated is passed to actual ignition timing determining means, whereby the normal ignition timing of the engine is quickly retarded to such an extent that excessive knocking can be avoided, and the timing can be recovered immediately after the end of the retardation.

16 Claims, 12 Drawing Figures

IGNITION TIMING CONTROL DEVICE FOR INTERNAL COMBUSTION ENGINES

BACKGROUND OF THE INVENTION

The present invention relates to an ignition timing control device for an internal combustion engine, and more particularly to a device which is designed to restrain knocking which tends to occur when the engine is manipulated in an attempt to produce an acceleration higher than a predetermined level.

It is known in the art that excessive knocking has an adverse effect on the durability of the engine whereas acceptable knocking contributes to attainment of optimum engine power output and fuel consumption characteristics. It is also known in the art that occurrence of knocking is closely related to the ignition timing of the engine and tends to be increased as the ignition timing is advanced.

In order to cope with the aforementioned situation, there has conventionally been proposed a device which is so designed as to normally maintain an acceptable knocking condition by causing the ignition timing to be advanced or retarded while detecting the knocking condition which is currently occurring in the engine, thereby achieving improved engine power output and fuel consumption characteristics.

In the conventional device described above, a feed-back control system is employed for controlling the ignition timing of the engine, so that a predetermined period of time, which corresponds to the time delay in response of the feed-back control system, is taken before the ignition timing is actually advanced or retarded in accordance with the detection of the current knocking condition. Thus, with such a device, it is possible to control the ignition timing to an optimum one in the case where the strength of knocking varies sufficiently slowly with respect to the predetermined period of time mentioned above.

Under a transitional driving condition where the driving condition is suddenly changed, however, there is the tendency that due to the time delay in response of the feed-back control system, the conventional device fails to control the ignition timing to an optimum one since under such a condition, the knocking condition is suddenly changed.

Knocking is more likely to occur under the transitional driving condition, particularly during the early stage of acceleration, as will be seen in FIG. 1. Such transient knocking only lasts for a period of time corresponding to several ignitions but is strong enough to impart an uncomfortable feeling to the driver. In order to restrain the transient knocking, it is required that the ignition timing be relatively greatly retarded as quickly as possible subsequent to the engine manipulation effected to achieve sudden acceleration such as sudden depression of the accelerator pedal. With the conventional device, however, it is not possible to attain such great and quick retardation of the ignition timing because of the fact that the device is usually arranged such that the ignition timing control is effected with a predetermined control speed to stabilize the control, more particularly, to prevent a hunting phenomenon from occurring in the control. This coupled with the aforementioned tendency, further enhances the tendency that the conventional device fails to achieve an optimum control of the ignition timing when a sudden acceleration is to be effected. Thus, with the conventional device, the combustion condition in the engine is deteriorated when such an acceleration as mentioned above is to be made, which leads to deterioration in the fuel consumption and power output characteristics of the engine.

Accordingly, it is an object of the present invention to provide a novel and improved ignition timing control device for an internal combustion engine, which is so designed as to avoid strong knocking which tends to occur when the engine is manipulated to produce an acceleration higher than a predetermined level, thereby establishing an optimum combustion condition in the engine.

According to an aspect of the present invention, there is provided an ignition timing control device for an internal combustion engine, comprising:

means for setting the normal ignition timing of the engine;

means responsive to occurrence of knocking in said engine for providing a first signal;

means responsive to a manipulation of the engine for achieving an acceleration higher than a predetermined acceleration level, for providing a second signal; and means for determining the actual ignition timing of the engine, said means being adapted, responsive to said first signal, for setting the ignition timing for an optimum knocking condition, said means being also adapted, responsive to said second signal, for causing said ignition timing to be quickly retarded in accordance with said second signal to such an extent that excessive knocking tending to occur when said manipulation is made can be avoided, and for causing said normal ignition timing to be recovered immediately after the end of the retardation thereof.

According to another aspect of the present invention, there is provided an ignition timing control device for an internal combustion engine, comprising:

means for setting the normal ignition timing of the engine;

means responsive to a manipulation of the engine for achieving an acceleration higher than a predetermined acceleration level, for providing a first signal; and means for determining the actual ignition timing of the engine, said means being adapted, responsive to said first signal, for causing said normal ignition timing to be quickly retarded in accordance with said first signal to such an extent that excessive knocking tending to occur when said manipulation is made can be avoided, and for causing said normal ignition timing to be recovered immediately after the end of the retardation thereof.

BRIEF DESCRIPTION OF THE DRAWINGS

Other objects, features and advantages of the present invention will become apparent from the ensuing description taken in conjunction with the accompanying drawings.

DETAILED DESCRIPTION OF THE PREFERRED EMBODIMENTS

Figure 1:
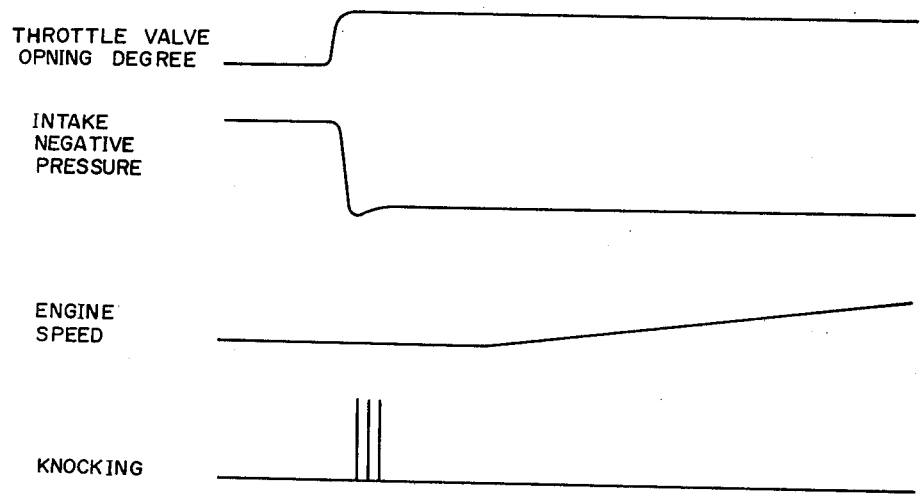
FIG. 1 is a chart showing the occurrence of knocking during a transitional driving condition of the engine, in relation to the throttle valve opening degree, intake vacuum pressure and engine speed.
Figure 2:
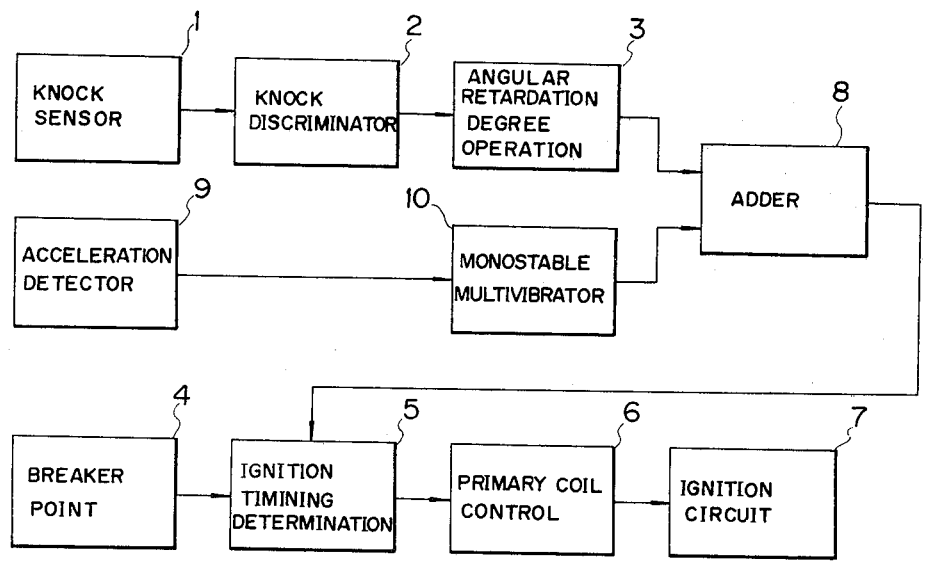
FIG. 2 is a block diagram showing the ignition timing control device according to an embodiment of the present invention.

Referring now to FIG. 2 of the drawings, there is illustrated the ignition timing control device according to an embodiment of the present invention, which includes a knock sensor 1, a knock discriminating unit 2, an angular retardation degree operating unit 3, a breaker point 4, an actual ignition timing determining unit 5, a primary coil control unit 6, an ignition circuit 7, an adder 8, an acceleration detector 9, and a monostable multivibrator 10.

As is known in the art, when knocking occurs, a particular frequency component of the pressure variation in the combustion chamber of the engine is increased, and this phenomenon may be utilized to detect the occurrence of knocking. Thus, the knock sensor 1 is designed to provide an electrical signal by detecting the pressure variation in the combustion chamber or various vibrations resulting therefrom such as, for example, vibrations of the engine body, sound waves emitted from the engine body, or the like.

The knock discriminating unit 2 is arranged to selectively take the aforementioned particular frequency component out of the output signal derived from the knock sensor 1, and discriminate whether or not knocking has occurred, on the basis of the intensity of the frequency component thus taken out. Upon detection of the occurrence of knocking, the discriminator 2 provides a pulse having a predetermined width such as shown at F in FIG. 3.

Figure 3:
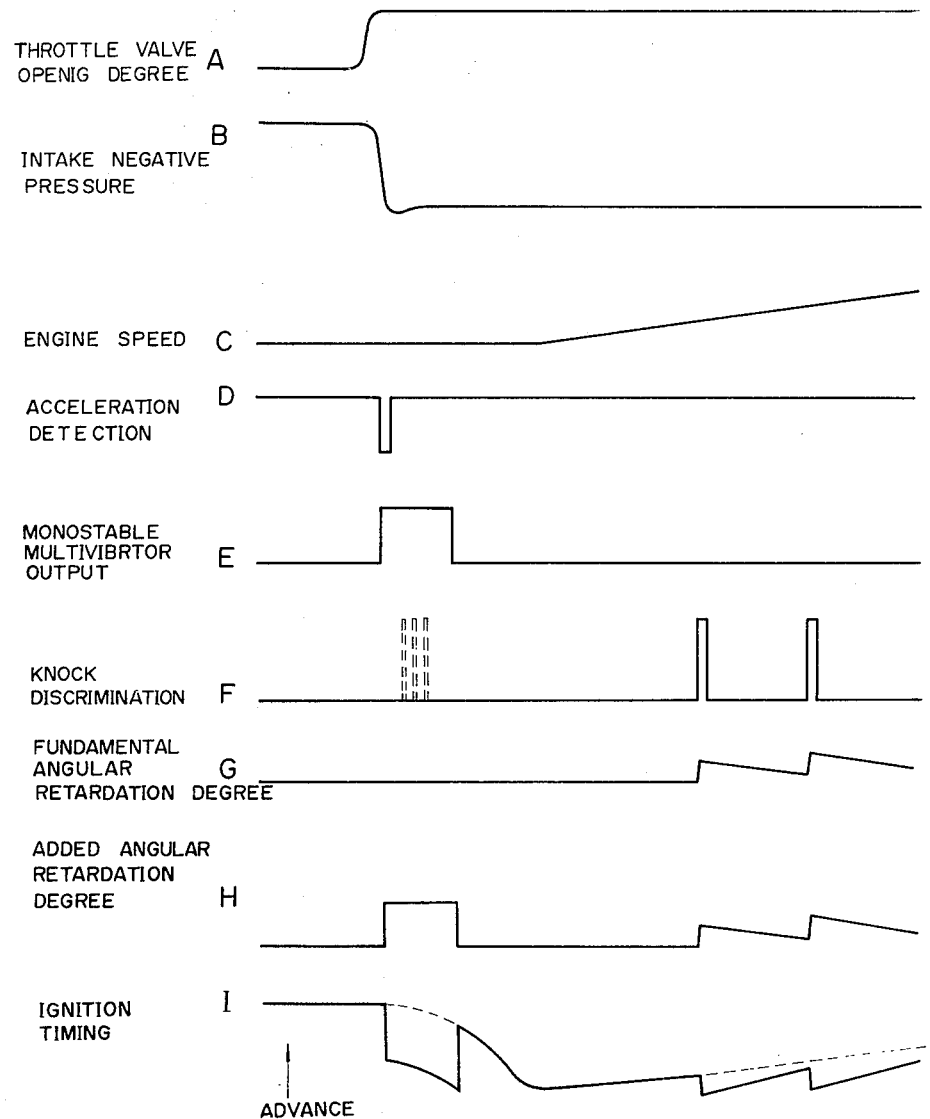
FIG. 3 shows waveforms useful for explaining the operation of the device shown in FIG. 2.

The angular retardation degree operating unit 3, which may comprise a type of charge-discharge circuit, is so designed as to provide, in response to a pulse provided by the knock discriminator 2, a voltage signal which builds up with a predetermined rate when the pulse is applied and then gradually decreases with a rate lower than the build-up rate as shown at G in FIG. 3.

The breaker point 4 generates a normal ignition timing signal whose timing is mechanically determined on the basis of the engine speed and engine load so that optimum engine operation is effected under normal operating conditions. The fundamental ignition timing thus generated constitutes a signal which is modified, when the ignition timing is subjected to a feed-back control through detection of knocking occurrence, whereby the ignition timing is controlled toward retardation when knocking has occurred. A magnetic pick-up or an optical pick-up may be employed in lieu of the breaker point.

The ignition timing determining unit 5 determines the actual ignition timing on the basis of the breaker point signal and the output signal of the adder 8. More specifically, the unit 5 serves to cause the normal ignition timing to be retarded in proportion to the output voltage of the adder 8.

The primary coil control unit 6 provides a dwell angle control and an output current control, thereby energizing the ignition coil in accordance with the output signal of the ignition timing determining unit 5.

The ignition circuit 7, which may be comprised of the primary coil, distributor, ignition coil and so forth, acts to ignite the engine by the output signal of the primary coil control unit 6.

The acceleration detector 9 is arranged to provide a pulse such as shown at D in FIG. 3 in response to a manipulation of the engine which is carried out in an attempt to achieve an acceleration higher than a predetermined level. The accelerating condition can be detected through detection of the rate of variation in the throttle valve opening degree, intake vacuum pressure, intake air flow rate or the like. In the case of an electronic fuel injection type engine, the detection of the acceleration condition can be made on the basis of the variation in the width of pulse signals for fuel injection since such a pulse width depends on the intake air flow rate.

Figure 4:
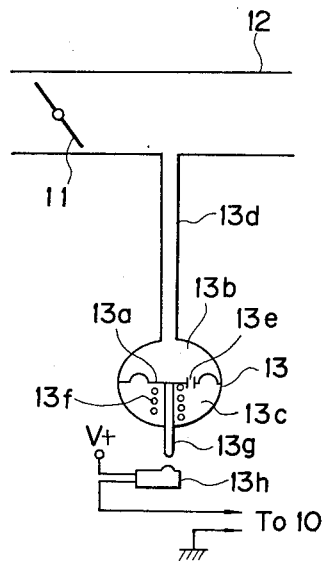
FIG. 4 is a view showing an example of means responsive to a manipulation of the engine for producing

Of the foregoing variables, the variation in the intake vacuum pressure, for example, may be detected by means of a differential pressure switch 13 which is operable in response to the pressure within intake conduit 12 downstream of a throttle valve 11 (FIG. 4).

The differential pressure switch 13 includes a diaphragm 13a which defines a pair of working chambers 13b and 13c. The working chamber 13b is in communication with the intake conduit 12 through a pipe 13d, and the working chamber 13c is in communication with the working chamber 13b through an orifice 13e. The inner cross section of the pipe 13d is larger than the opening 13e. Thus, as the throttle valve 11 is opened in response to the manipulation of the engine for producing the desired acceleration and the pressure within the intake conduit 12 is thereby caused to increase, the pressure within the working chamber 13b increases rapidly, whereas the pressure within the working chamber 13c increases only gradually. As a result, the diaphragm 13a is deflected downwardly against a spring 13f provided therebelow so that a working rod 13g secured to the diaphragm is moved to close a contact 13h, whereby a pulse is generated which has a width corresponding to the extent of the acceleration.

By changing the resilient force of the spring 13f and/or the cross-sectional area of the orifice 13e, it is possible to regulate the extent of acceleration which can be detected. By making the cross-sectional area of the orifice 13e smaller, for example, it is possible to detect a lower acceleration. Thus, in this embodiment of the present invention, the resilient force of the spring 13f and/or the cross-sectional area of the orifice 13e is previously set up such that the differential pressure switch 13 is enabled to provide an output pulse only under such a high acceleration condition that the ignition timing cannot be controlled to an optimum one.

Figure 5:
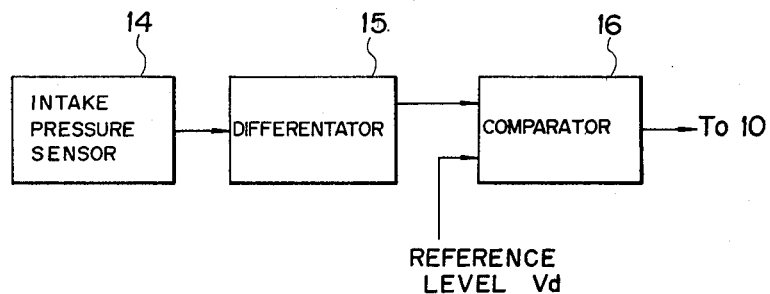
FIG. 5 is a block diagram showing a further example of the above-mentioned means.

Another example of the means for detecting the accelerating condition on the basis of intake vacuum pressure variations may be constructed as shown in FIG. 5, which may comprise an intake pressure sensor 14 adapted to provide a voltage signal which is proportional to the pressure within the intake conduit downstream of the throttle valve; a differentiation circuit 15 for differentiating the signal of the sensor 14; and a comparator 16 which is so designed as to provide an output pulse only when the output voltage of the differentiation circuit 15 exceeds or goes beyond a predetermined level.

Figure 6:
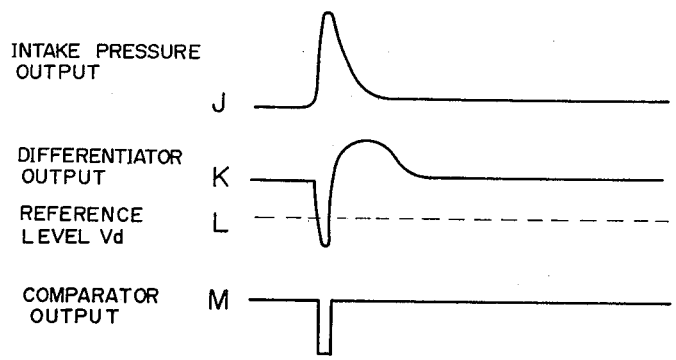
FIG. 6 is a view of waveforms useful for explaining the operation of the means shown in FIG. 5.

Let it be assumed that the output of the intake pressure sensor 14 varies under an accelerating condition as shown at J in FIG. 6. Then, the output voltage of the differentiation circuit 15 will appear as shown at K in FIG. 6; thus, only when this output voltage goes beyond a predetermined voltage level Vd such as shown at L in FIG. 6, the comparator 16 will be enabled to provide an output pulse. In this case, the predetermined level Vd of the reference voltage applied to the comparator is selected such that the comparator 16 is enabled to provide the output pulse only when the engine is manipulated to make an abrupt acceleration.

Figure 7:
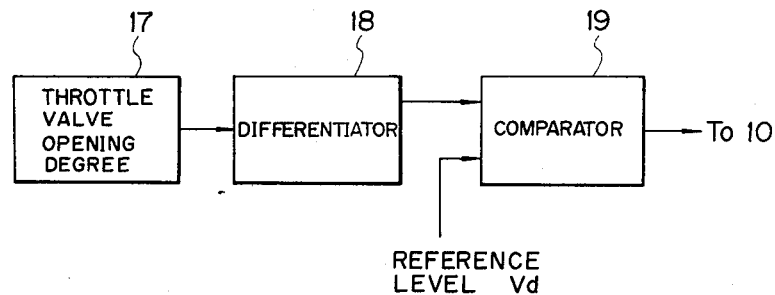
FIG. 7 is a block diagram showing a still further example of the aforementioned means.

In order to detect the rate of variation in the throttle valve opening degree, use may be made of a throttle valve opening degree sensor 17 which may comprise a slide rheostat which is arranged such that the output voltage thereof varies in proportion to the throttle valve opening degree, as will be seen from FIG. 7.

Figure 8:
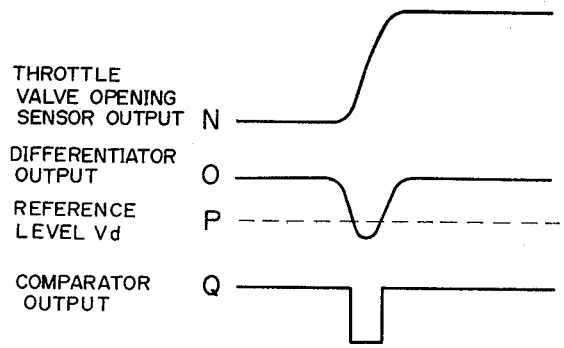
FIG. 8 is a view of waveforms useful for explaining the operation of the means shown in FIG. 7.

More particularly, the output voltage signal of the throttle valve opening degree sensor, which builds up as the throttle valve is turned in the opening direction as shown at N in FIG. 8, is differentiated by a differentiation circuit 18 as shown at O in FIG. 8; subsequently the signal resulting from the differentiation is compared in a comparator 19 with a predetermined voltage level Vd shown at P in FIG. 8; and thus a pulse such as shown at Q in FIG. 8 is generated when the signal resulting from the differentiation goes below the predetermined voltage level. That is, the comparator is enabled to provide the pulse only when the throttle valve is quickly opened, whereby the abrupt acceleration is detected.

Variations in the intake air flow rate can be detected by utilizing the output voltage of an air flow meter employed in an electronic fuel injection type engine.

In this way, when the engine is manipulated for a sudden acceleration, the acceleration detector 9 shown in FIG. 2 detects it and thereupon provides an acceleration detection pulse.

The adder 8 sums up the output signal of the angular retardation degree operating unit 3 and the output signal of the monostable multivibrator 10, thus providing an angular retardation signal, such as shown at H in FIG. 3, which serves as a control voltage for the ignition timing determining unit 5.

With reference to FIG. 3, description will now be made of the operation of the device according to this embodiment of the present invention.

If the accelerator is suddenly depressed when the vehicle is stopped or running under a steady-state driving condition, then the opening degree of the throttle valve will be suddenly increased as shown at A in FIG. 3, as a result of which the intake vacuum pressure will be suddenly decreased as shown at B in FIG. 3. However, the engine speed will be increased not instantaneously but with a time delay as shown at C in FIG. 3.

Let it be assumed that the differential switch 13 is employed as the acceleration detector 9. Then the differential pressure switch 13, when the vacuum pressure drops as shown at B in FIG. 3, will provide an acceleration detection pulse such as shown at D in FIG. 3.

The acceleration detection pulse shown at D in FIG. 3 will be applied to the monostable multivibrator 10 and thereby converted to a pulse having a predetermined width and height such as shown at E in FIG. 3. In this case, it is to be noted that the width of the pulse provided by the monostable multivibrator 10 is made greater than that corresponding to the duration of transient knocking which tends to occur under a normal accelerating condition. It has experimentally been confirmed that about 100 to 300 m sec. is an optimum range of such a pulse width and that in such a range, there occurs no substantial deterioration in the driving quality of the engine.

When the occurrence of the knocking under the normal accelerating condition is detected by the knock sensor 1, a knock discrimination signal such as shown at F in FIG. 3 will be derived from the knock discriminating unit 2, and a fundamental angular retardation degree as shown at G in FIG. 3 will be calculated by the angular retardation degree operating unit 3. This fundamental angular retardation degree represents the optimum angular retardation degree for the ignition timing which is effective to control the engine so that an acceptable knocking condition occurs therein while the engine is being driven under a steady-state or normal driving condition.

As mentioned earlier, however, it is not possible to prevent transient knocking which tends to occur under a sudden acceleration condition, on the basis of the fundamental angular retardation degree alone. In order to cope with such a situation, therefore, according to the present invention, the output (FIG. 3G) of the angular retardation degree operating unit 3, which represents the fundamental angular retardation degree achieved as the result of the knock detection, and the output (FIG. 3E) of the monostable multivibrator 10, which represents the transient angular retardation degree achieved as the result of the acceleration detection, will be added in the adder 8, and a new angular retardation signal such as shown at H in FIG. 3 resulting from the addition will be passed to the ignition timing determining unit 5.

As shown at I in FIG. 3, the ignition timing determining unit 5 will cause the normal ignition timing (shown by the dashed line in FIG. 3I), which is mechanically set by means of the centrifugal angular advancement mechanism and vacuum angular retardation mechanism, to be retarded by a degree corresponding to the added angular retardation degree (FIG. 3H).

If the ignition timing is greatly retarded during an accelerating condition, this will cause engine power output to be dropped down so that the driving quality will be deteriorated. By selecting the duration of the ignition timing retardation during the accelerating condition to be in the range of about 100 to 300 m sec., however, it is possible to restrain occurrence of knocking below an acceptable level, without deteriorating the driving quality, even if the angular retardation degree is set to be as great as 5 to 30 degrees in terms of crank angle.

In this way, according to the present invention transient knocking which tends to occur under a sudden acceleration condition, can be restrained below the acceptable level, without deteriorating the driving quality, and thus a satisfactory control of the ignition timing can be achieved under all driving conditions.

Figure 9:
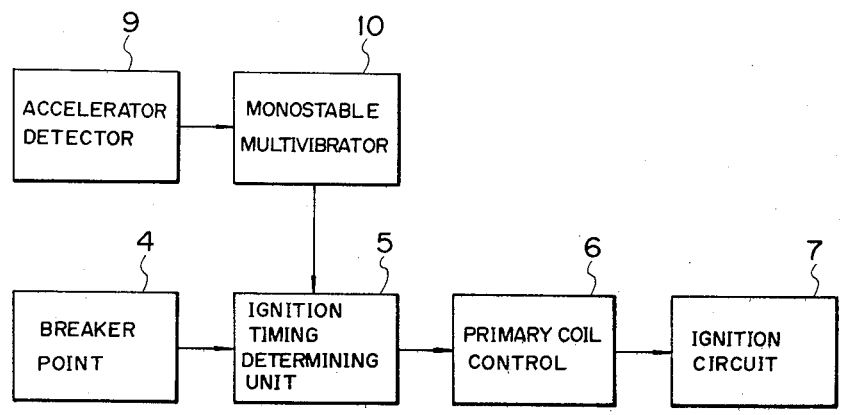
FIG. 9 is a block diagram showing the device according to a further embodiment of the present invention.
Figure 10:
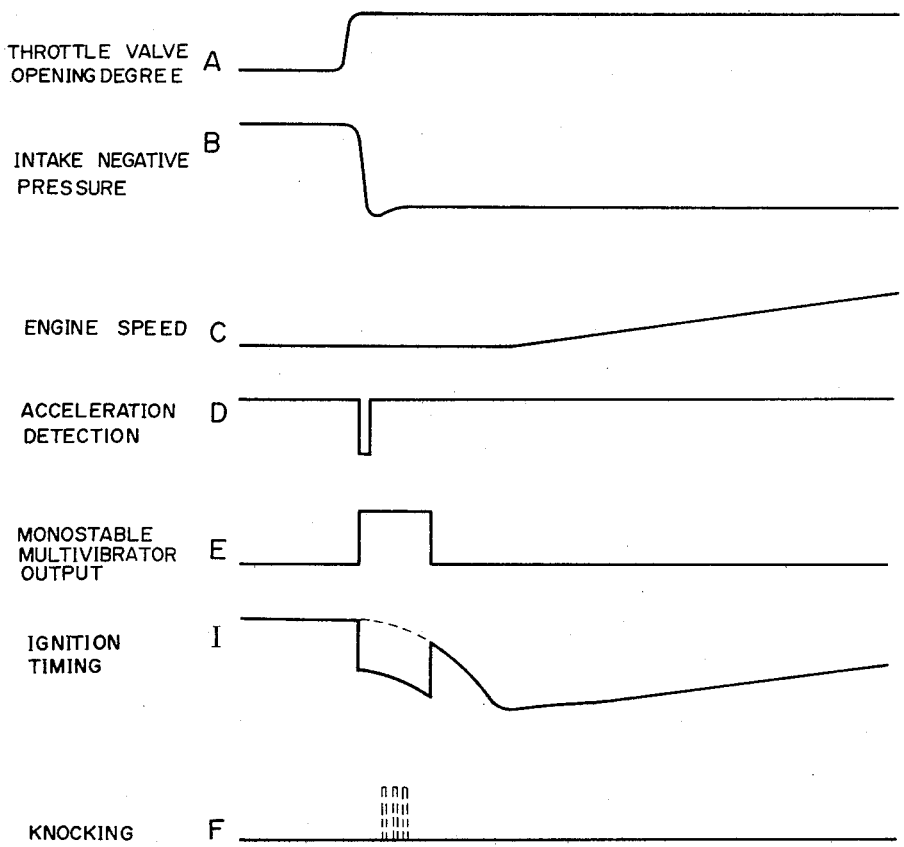
FIG. 10 is a view of waveforms useful for explaining the operation of the device shown in FIG. 9.

The above-described embodiment is most effectively applicable to a system wherein the ignition timing is controlled by way of feed-back with knocking being detected as mentioned above, and it is also effectively applicable to an ignition system wherein knock detection is not made. Referring to FIG. 9, there is shown another embodiment of the present invention which is applied to the ignition system wherein knock detection is not made. This embodiment is similar to the foregoing embodiment shown in FIG. 2, except that knock sensor 1, knock discriminator 2, angular retardation degree operating unit 3 and adder 8 are omitted. FIG. 10 illustrates the operation of this embodiment, which is the same as that of the embodiment of FIG. 2 except that feed-back control by way of knock detection is not effected. More specifically, according to this embodiment, the ignition timing is retarded at the early stage of acceleration by a predetermined period of time which is determined on the basis of the output of the acceleration detector 9 so that transient knocking tending to occur when the engine is manipulated to produce a sudden acceleration, can be restrained below an acceptable level without deteriorating the driving quality.

Figure 11:
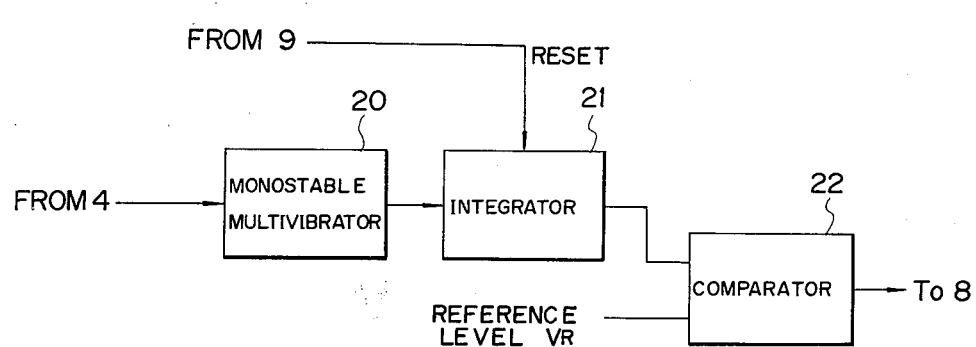
FIG. 11 is a block diagram showing yet another example of the above-described means.

Although in each of the foregoing embodiments of the present invention, the period of time by which the ignition timing is retarded under an accelerating condition is determined on the basis of the duration of a pulse provided by the monostable multivibrator, similar effects can also be produced on the basis of the predetermined number of the ignitions which occur under the accelerating condition. More specifically, in each of the embodiments shown in FIGS. 2 and 9, the monostable multivibrator 10 may be replaced with a circuit arrangement such as shown in FIG. 11 which comprises a monostable multivibrator 20, an integrator 21 and a comparator 22, thereby generating a pulse for causing the ignition timing to be retarded to a degree corresponding to the aforementioned predetermined number of the ignitions.

Figure 12:
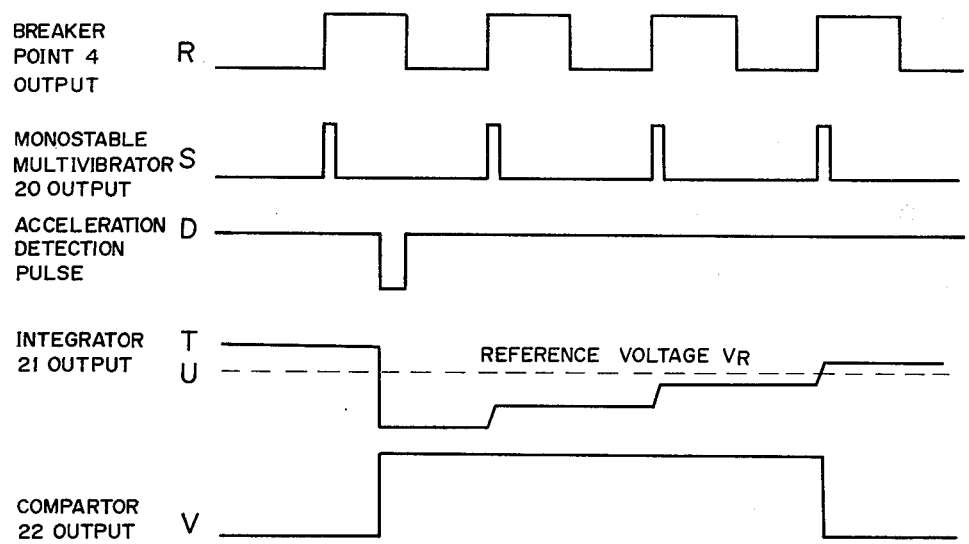
FIG. 12 is a view of waveforms useful for explaining the operation of the means shown in FIG. 11.

With reference to FIG. 12, description will be made of the operation of the arrangement shown in FIG. 11, wherein an output waveform such as shown at R in FIG. 12 derived from the breaker point 4 is provided to the monostable multivibrator 20 which in response thereto provides a pulse having a predetermined width such as shown at S in FIG. 12. The integrator 21, which normally has its output saturated with pulses successively applied thereto by the aforementioned monostable multivibrator 20, is reset by an acceleration detection pulse such as shown at D in FIG. 12 generated by the acceleration detector 9 so that the output thereof becomes nil. Thus, for each ignition, the output of the integrator will be increased, as shown at T in FIG. 12, in response to each output pulse (FIG. 12S) of the monostable multivibrator. The output (FIG. 12T) of the integrator will then be compared in the comparator 22 with a reference voltage $V_R$ such as shown at U in FIG. 12, and by this comparison, a pulse such as shown at V in FIG. 12 will be provided which corresponds to the predetermined number of ignitions. It is to be noted that the number of ignitions can desirably be set by adjusting the reference voltage $V_R$. Experiments have shown that by setting the number of ignitions in a range of several ignitions, e.g., two or three to five or six ignitions, it is possible to restrain transient knocking, which tends to occur when the engine is manipulated to produce a sudden acceleration as mentioned above, without deteriorating the driving quality.

By designing the device such that the length of time by which the ignition timing is retarded during an accelerating condition is set up on the basis of the predetermined duration of a pulse provided by the monostable multivibrator, the construction of the device is simplified. However, with such a design, if the duration of the output pulse provided by the monostable multivibrator is so set up as to prevent transient knocking from occurring in a relatively low engine speed range, it is likely that the driving quality and/or exhaust performance will be deteriorated due to the fact that the occurrence of knocking immediately subsequent to the manipulation of the engine made to produce a sudden acceleration will only last for a period of time corresponding to two or three ignitions.

In contrast thereto, by designing the device such that the ignition timing is retarded by a length of time which is set up on the basis of the number of ignitions, it is possible to restrain occurrence of transient knocking, without deteriorating the driving quality and/or exhaust performance, both in relatively low and relatively high engine speed ranges, although the scale of the circuitry is slightly increased.

As will be appreciated from the foregoing explanation, according to the present invention, the ignition timing can quickly be controlled, i.e., increased or decreased, to an optimum one at the early stage of acceleration so that the combustion condition of the engine can optimumly be controlled even during a transitional driving condition such as suddenly accelerating condition, thereby making it possible to achieve improved fuel consumption and power output characteristics as well as an improved response characteristic during the accelerating condition. It is also possible that the exhaust gas recirculation flow rate, fuel injection timing, antiknocking agent injection quantity or the like may be similarly controlled concurrently with the ignition timing.

Retarding the ignition timing when the engine is manipulated in an attempt to produce a sudden acceleration, that is, when the accelerator is abruptly depressed, is effective to avoid occurrence of undesirable knocking, but is not desirable from the standpoint of achieving a maximum engine power output. In this connection, it is to be particularly noted that in view of the above, according to the present invention, the design is made such that the normal ignition timing is quickly retarded in response to the manipulation of the engine to produce the sudden acceleration, and recovered immediately after the end of the retardation, thereby minimizing possible deterioration in the acceleration characteristics of the engine.

While the present invention has been described with respect to specific embodiments thereof, it is to be understood that the invention is by no means limited thereto and includes all changes and modifications which will become possible within the scope of the appended claims.

What is claimed is:

1. An ignition timing control device for an internal combustion engine, comprising:
   first means for setting the normal ignition timing of the engine;
   second means responsive to occurrence of knocking in said engine for providing a first signal; p1 third means responsive to manipulation of the engine for achieving an acceleration higher than a predetermined acceleration level, for providing a second signal; and fourth means for determining the actual ignition timing of the engine, said fourth means being adapted, responsive to said first signal, for setting the ignition timing for an optimum knocking condition, said fourth means being also adapted, responsive to said second signal, for causing said normal ignition timing to be quickly retarded in accordance with said second signal to such an extent that knocking tending to occur when said manipulation of the engine is made can be avoided, and for causing said normal ignition timing to be recovered immediately after the end of the retardation thereof, said third means comprising:

a monostable multivibrator responsive to a signal derived from said first means;

an integrator circuit adapted to be reset by a signal obtained in said third means in response to said manipulation of the engine and for integrating the output of said monostable multivibrator for a period of time corresponding to a predetermined number of ignitions occurring subsequent to said manipulation of the engine so that the duration of said ignition timing retardation is determined on the basis of said predetermined number of ignitions; and a comparator for comparing the output of said integrator circuit with a reference signal corresponding to said predetermined acceleration level, thereby providing said second signal.

2. An ignition timing control device according to claim 1, wherein said predetermined number of ignitions comprise about two or three to five or six ignitions.

3. An ignition timing control device according to claim 1, wherein said first means comprises a breaker point.

4. An ignition timing control device according to claim 1, wherein said first means comprises a magnetic pick-up.

5. An ignition timing control device according to claim 1, wherein said first means comprises an optical pick-up.

6. An ignition timing control device according to claim 2, wherein said first means comprises a breaker point.

7. An ignition timing control device according to claim 2, wherein said first means comprises a magnetic pick-up.

8. An ignition timing control device according to claim 1, wherein said first means comprises an optical pick-up.

9. An ignition timing control device for an internal combustion engine, comprising:

first means for setting the normal ignition timing of the engine;

second means responsive to manipulation of the engine for achieving an acceleration higher than a predetermined acceleration level, for providing a first signal; and third means for determining the actual ignition timing of the engine, said third means being adapted, responsive to said first signal, for causing said normal ignition timing to be quickly retarded in accordance with said first signal to such an extent that excessive knocking tending to occur when said manipulation of the engine is made can be avoided, and for causing said normal ignition timing to be recovered immediately after the end of the retardation thereof;

said second means comprising:

a monostable multivibrator responsive to a signal derived from said first means;

an integrator circuit adapted to be reset by a signal obtained in said second means in response to said manipulation of the engine and for integrating the output of said monostable multivibrator for a period of time corresponding to a predetermined number of ignitions occurring subsequent to said manipulation of the engine so that the duration of said ignition timing retardation is determined on the basis of said predetermined number of ignitions; and a comparator for comparing the output of said integrator circuit with a reference signal corresponding to said predetermined acceleration level, thereby providing said first signal.

10. An ignition timing control device according to claim 9, wherein said predetermined number of ignitions comprise about two or three to five or six ignitions.

11. An ignition timing control device according to claim 9, wherein said first means comprises a breaker point.

12. An ignition timing control device according to claim 9, wherein said first means comprises a magnetic pick-up.

13. An ignition timing control device according to claim 9, wherein said first means comprises an optical pick-up.

14. An ignition timing control device according to claim 10, wherin said first means comprises a breaker point.

15. An ignition timing control device according to claim 10, wherein said first means comprises a magnetic pick-up.

16. An ignition timing control device according to claim 10, wherein said first means comprises an optical pick-up.

* * * * *